US006966987B1

(12) United States Patent
Morgan, Jr. et al.

(10) Patent No.: US 6,966,987 B1
(45) Date of Patent: Nov. 22, 2005

(54) TANGENTIALLY FED MEDIA FILTER METHOD AND APPARATUS

(75) Inventors: Joseph A. Morgan, Jr., Charlotte, NC (US); Stuart H. Smith, III, Fort Mill, SC (US)

(73) Assignee: Process Efficiency Products, Inc., Mooresville, NC (US)

( * ) Notice: Subject to any disclaimer, the term of this patent is extended or adjusted under 35 U.S.C. 154(b) by 202 days.

(21) Appl. No.: 10/342,422

(22) Filed: Jan. 13, 2003

Related U.S. Application Data

(60) Provisional application No. 60/347,763, filed on Jan. 11, 2002.

(51) Int. Cl.[7] .......................... B01D 21/26; B01D 41/02
(52) U.S. Cl. ...................... 210/279; 210/263; 210/265; 210/269; 210/275; 210/290; 210/512.1; 210/519
(58) Field of Search .............................. 210/788, 791, 210/263, 265, 269, 275, 279, 290, 512.1, 210/519

(56) References Cited

U.S. PATENT DOCUMENTS

| | | | |
|---|---|---|---|
| 2,101,961 A * | 12/1937 | Slidell ........................ | 210/275 |
| 3,680,701 A * | 8/1972 | Holca ........................ | 210/275 |
| 3,814,247 A * | 6/1974 | Hirs ........................... | 210/290 |
| 4,141,824 A | 2/1979 | Smith | |
| 4,859,330 A * | 8/1989 | Pauwels ..................... | 210/275 |
| 5,413,710 A * | 5/1995 | Roberts et al. ............. | 210/275 |
| 5,641,397 A * | 6/1997 | Grienberger ................ | 210/519 |
| 5,858,219 A * | 1/1999 | Kusmierz et al. ........... | 210/275 |

* cited by examiner

*Primary Examiner*—David A. Reifsnyder
(74) *Attorney, Agent, or Firm*—Dougherty, Clements & Hofer

(57) ABSTRACT

A water treatment device for purifying process water by filtration comprising a housing containing a filter media, having a bottom gravel bed and an upper silica bed, and a fluidizer for backwashing the filter media. Process water is tangentially introduced and caused to swirl in the housing above a filter media, before passing downwards through silica and gravel beds. The swirling increases the through capacity of the treatment device and reduces the amount of particles that would otherwise become imbedded in the filter media. Backwashing is accomplished by forcing fluid, through first and second components of the fluidizer, into the filter media. The first component is a channel formed in the manifold which provides backwash fluid to the bottom of the gravel bed. The second component provides backwash fluid at the gravel bed—silica bed interface by a series of radially spaced fluidizer arms. The fluidizer manifold provides complete fluidization of the filter media such that the filter media does not have no flow, or low flow, areas.

11 Claims, 4 Drawing Sheets

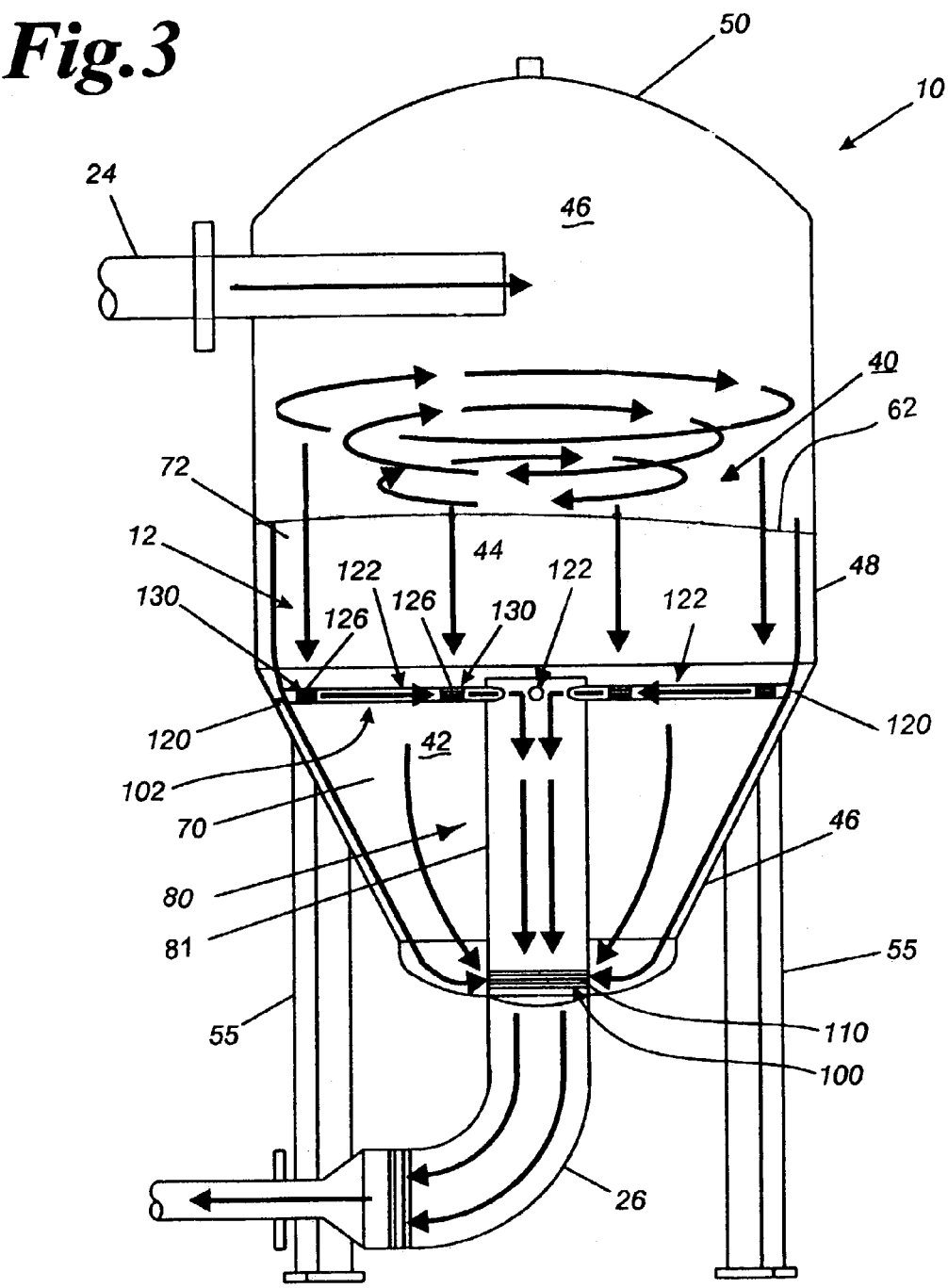

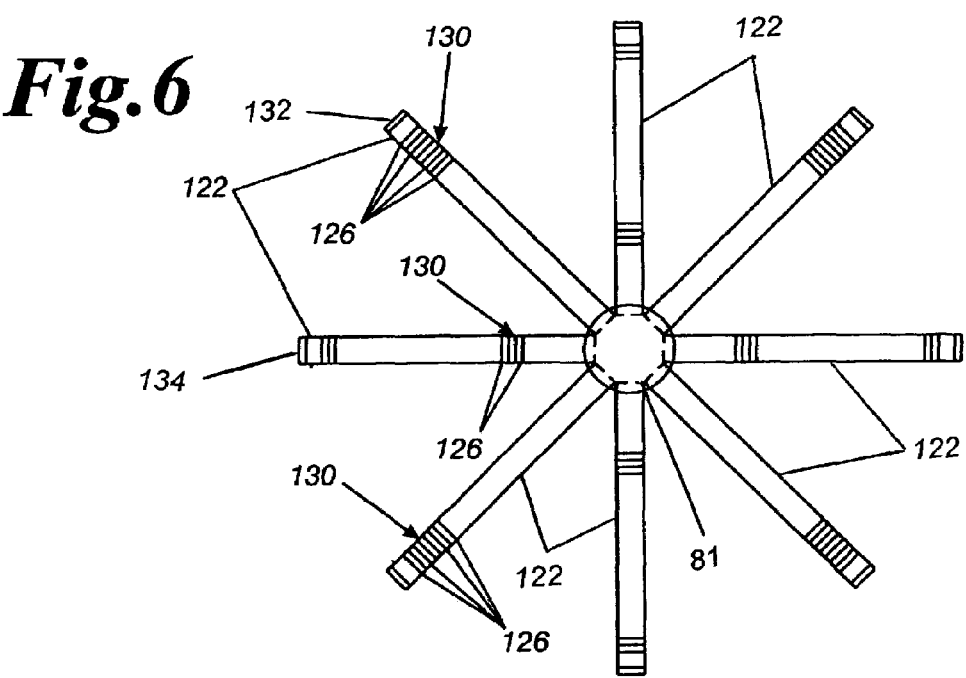
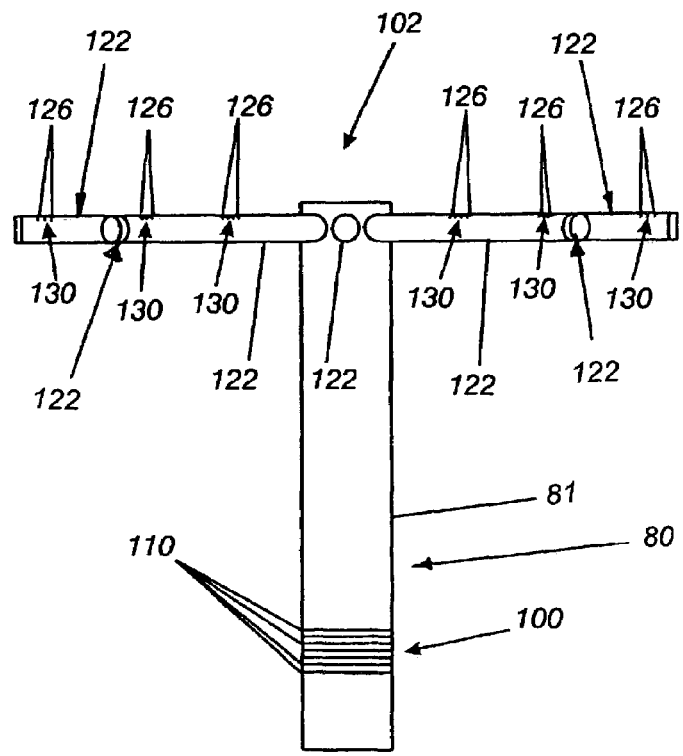

TANGENTIALLY FED MEDIA FILTER METHOD AND APPARATUS

CROSS REFERENCE TO RELATED APPLICATION

This application claims the benefit of U.S. Provisional Application No. 60/347,763, filed on Jan. 11, 2002.

FIELD OF THE INVENTION

The present invention relates to an method and apparatus for filtering suspended solids from water, and more particularly to a mechanical filtration device which removes suspended solids from cooling tower process water for reuse by the cooling tower.

BACKGROUND OF THE INVENTION

In the past, fluid from cooling towers was directly discharged without the benefit of treatment or recycling for reuse the cooling tower. However, since the 1970's, such discharge has been subject to EPA pre-treatment standards and NPDES effluent limitations, as well as local regulations. Additionally, such "once through" water usage leads to high water and sewage cost.

In response to regulatory restrictions and water cost, water filtration devices have been developed to treat cooling tower discharge for recycling back to the cooling tower. It is important that the water quality from such treatment devices be sufficient to prevent scaling, erosion, and biological fouling in the cooling tower. Of particular importance is the removal efficiency of suspended solids. The concentration of suspended solids in cooling tower inlet water effects the number of times that in which the water can be recycled before solids precipitate from solution. Clearly, water with high initial suspended solids can be recycled only a minimal number of times before precipitation occurs in comparison to more purified water.

Two common treatment devices which provide full flow filtration of process water from a cooling tower are centrifugal separators and sand bed filters. Centrifugal separators tangentially introduces flow water into a cylindrical housing, causing the water to swirl. Suspended solids with a specific gravity greater than that of water migrate to the perimeter wall of the cylinder where they are assisted downward by gravity into a collection sump and is periodically removed as sludge. This process is limited in that it has a relatively poor removal efficiency for suspended solids having a specific gravity moderately above that of water, and for smaller solids such as those less than 45 microns in diameter.

Sand bed filters operate by passing a fluid through filtering sand contained within a vessel. Suspended solids within the fluid are captured by the sand while the cleansed fluid passes there-through. Sand bed filters are particularly effective in removing suspended solids, including those of a relatively small size. When the sand begins to clog, a pressure differential switch signals a backwash cycle that reverses the flow through the sand thereby lifting it and carrying captured particulate matter away from the sand filter for proper disposal.

Current sand filter technology introduces the backwash flow at a distance above the bottom of the treatment vessel by employing a header and lateral system. The header and lateral configuration inherently has gaps between the laterals and, consequently, has spaces where no flow occurs making it difficult, if not impossible, to fully fluidize the filter bed. Additionally, the space below the header and laterals to the bottom of the vessel are provided with no, or only minimal, flow. Accordingly, present filter beds become clogged with particulate matter which decreases the useful life of the treatment device and cooling tower. Further, as the filter bed becomes clogged, the pressure head across the filter increases, reducing the capacity of the filter to treat fluids in terms of fluid through rate and suspended solids removal efficiency. The poisoned bed, impregnated by particulate matter, must be replaced before continued use.

What is needed is a water treatment device that is highly efficient in removing suspended solids. Also needed is for a water treatment device that is fully fluidized during backwashing, thereby providing a long effective life. Also needed is for the water treatment device to be small in size yet capable of treating process water at a high flow rate.

DESCRIPTION OF THE PRIOR ART

Applicant is aware of the following U.S. Patent concerning an apparatus using a filter media for treating water:

| U.S. Pat. No. | Issue Date | Inventor | Title |
|---|---|---|---|
| 4,141,824 | Feb. 27, 1979 | Smith | Tangentially fed upflow sand filter method and apparatus |

Smith, U.S. Pat. No. 4,141,824, discloses an apparatus for purifying water by filtration in which water is passed upwardly through one or more sand beds supported in a tower, at a slow rate so that the sand bed in not disturbed. Water feed to each tower is accomplished by tangentic flow from an inlet. Backwash of the sand bed is accomplished by opening a duct valve at the coned lower end which forms the base of the tower in which the sand bed is supported. Bacterial activity in the lower part of the sand bed is controlled to enhance purification of the water. Additionally, chemical treatment of the water may be used in conjunction with filtration to further treat the water.

SUMMARY OF THE INVENTION

The present invention is a fluid treatment device having a filter media for purifying process water. The device effectively removes suspended solids from the process water. Moreover, the device fully fluidized and expands, by at least thirty percent, the filter media during backwashing in order to remove captured solids. The device is configured to provide superior solids removal during backwashing thereby increasing the effective life of the filter media.

In the broadest sense, the present invention relates to a fluid treatment device having a housing and a filter media positioned within the housing. A fluidizer is also provided for the purpose of backwashing the filter media. The fluidizer has a first component for providing backwash fluid into an end of the filter media. Preferably, the filter media includes a first media bed juxtaposed with a second media bed. In addition to providing backwash fluid into the end of the filter media, the fluidizer has a second component that delivers backwash fluid to the filter media at or near the interface between the first media bed and the second media bed. More preferably, the second component includes a plurality of radially arranged arms.

Also in the broadest sense, the present invention relates to a method for backwashing a treatment device comprising the steps of providing a housing, providing a filter media within the housing, providing a fluidizer within the housing for backwashing the filter media, and causing complete fluidization of the filter media. Preferably, the backwashing method also include causing the filter media to expand at least thirty percent. More, preferably, the method includes providing backwash fluid at the end of the filter media and to or near an interface between a first media bed and a second media bed which comprise the filter media.

OBJECTS OF THE INVENTION

The principal object of the invention is to provided an improved method and apparatus for purifying water by filtration.

Another object of the invention is to provide a water treatment device for removing suspended solids from process water.

A further object of the present invention is to provide a water treatment device that efficiency removes suspended solids, including those of small diameter.

Another object of the present invention is to provide a water treatment device that is small in size and can treat a high through-put rate.

Another object of the present invention is to provide a water treatment device that fully fluidizes the filter media during backwashing.

Another object of the present invention is to provide a water treatment device that accomplishes backwashing with substantially less water than for comparatively sized conventional filtration devices.

BRIEF DESCRIPTION OF THE DRAWINGS

The foregoing and other objects will be become more readily apparent by referring to the following detailed description and the appended drawings in which:

FIG. 3 is a cross sectional view of the water treatment device of FIG. 1, showing the treatment device in treatment mode with a filter media for treating process water and a fluidizer for allowing egress of treated water from the treatment device, and showing the flow path of the process water as it is being treated;

FIG. 5 is a side view of the fluidizer of FIG. 3; and

FIG. 6 is a top view of the fluidizer of FIG. 5.

DETAILED DESCRIPTION

The present invention is a filtration treatment device having a filter media for purifying a fluid. Not to be construed as limiting, the treatment device is typically employed to treat process water from a cooling tower for reuse by the cooling tower. The filter media effectively removes suspended solids from the process water. Periodically, the filter media is fully fluidized by backwashing in order to remove captured solids therefrom. The device is configured to provide superior solids removal during backwashing thereby increasing the effective life of the filter media.

Figure 2:
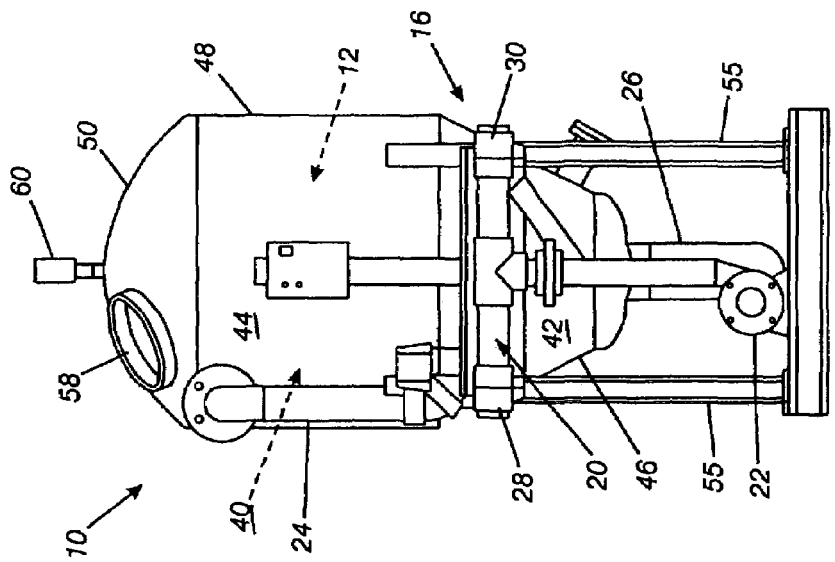
FIG. 2 is a front view of the water treatment device and piping assembly of FIG. 1.
Figure 1:
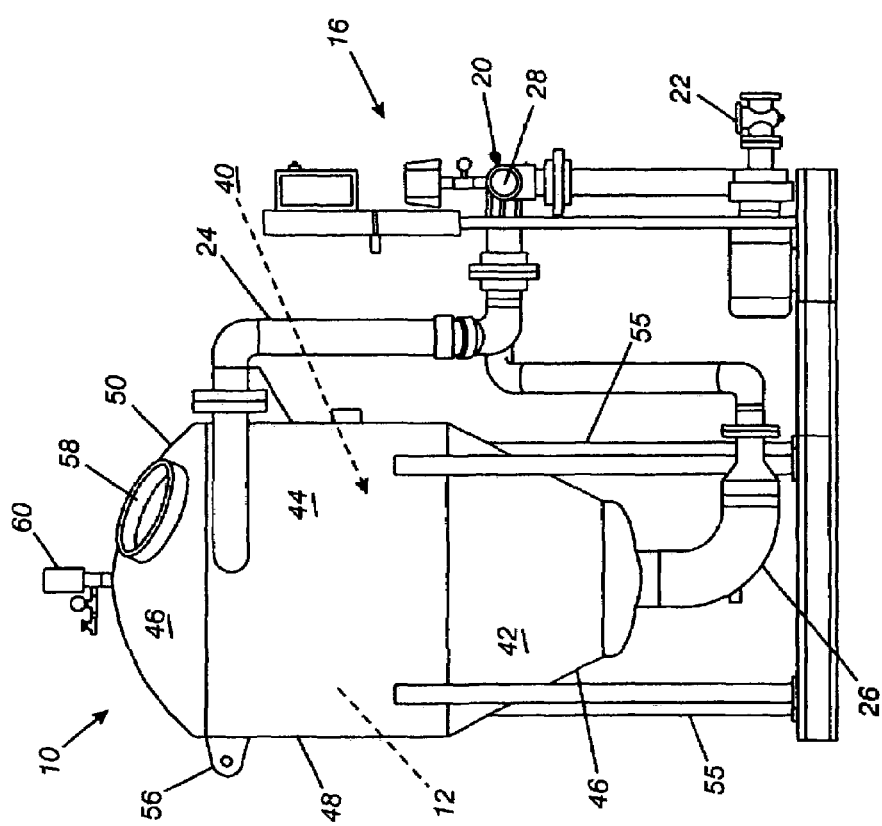
FIG. 1 is a side view of the invented water treatment device and piping assembly.

Referring now to the drawings, and particularly to FIGS. 1 and 2, a water treatment device 10 is shown comprising a filter media 12 contained within a housing 14. Process water, from a source such as, for example, a cooling tower, is passed downwardly through the media 12 in order to filter organic and inorganic matter from the process water.

A piping assembly 16 handles the process water for delivery to the treatment device 10, the treatment device effluent for returning to the cooling tower, or to some other location, and backwash water, when backwashing is being performed. Specifically, the piping assembly 16 includes a manifold 20 having a three way valve and a pair of actuators to control flow into the following conduits: a process water conduit 22 for conveying process water from the source, an inlet conduit 24 for delivering process water to the device 10 for treatment, an outlet conduit 26 for carrying effluent from the treatment device 10 and for conveying backwash, a return conduit 28 for returning effluent for reuse by the source, and a waste conduit 30 (FIG. 2) for conveying backwash to a settling pond or other location for further treatment. For simplicity, components such as valves, pumps, pressure gauges, and the like, are omitted from description as these elements are conventional and may be provided as necessary by the skilled practitioner in the art. Flow meters may also be provided as desired or required for proper operation of the treatment device 10.

The housing 14 defines a chamber 40 having a cylindrical intermediate portion 42, a top portion 44 and a conical bottom portion 46, which are respectively defend by a circular side wall 48, a concave top wall 50 that closes the top of the housing 14, and a conical lower wall 52 that forms the bottom of the housing 14. These housing 14 portions are joined by conventional welding to hold the filter media 12. The housing 14 is supported on a suitable foundation, not shown, by a plurality of spaced columns 55, in conventional manner. Suitable cross braces for the columns 55, not shown, may also be provided.

The intermediate portion 42 of the housing 14 may be of any suitable diameter, but in most applications the diameter will be between 2 feet and 3 feet. The housing 14 may also be of any suitable height, but typical will be between 5 feet and 7 feet so that the filter media 12 can be of sufficient depth. The depth of the filter media 12, for a given application, is determined by known engineering methods taking into account the degree of process water purification desired and the point of decreasing returns where excessive pumping pressures are encountered without great benefaction to water purity.

The housing 14 is provided with an integral ear 56 (FIG. 1) coupleable to a crane for controlled movement of the housing 14 during construction and installation. A loading port 58 is provided in the top of the housing 14 for loading filter media 12. Also provided in the top portion 44 of the housing 14 is an air release valve 60 for preventing inadvertent rupture of the housing 14 due to pressure changes during operation and backwashing. A cleanout port, not shown, is provided in the lower end of the housing 14 for filter media 12 removal under atypical scenarios wherein the filter media 12 has become contaminated or impacted.

Referring to FIG. 3, the inlet conduit 24 is sealedly fixed through the circular side wall 48, preferably by welding, so that the process water conveyed there-through is introduced tangentially into the housing 14 above the filter media 12. Tangential communication between the inlet conduit 24 and cylindrical side wall 48 causes the water to circularly swirl along the top of the filter media 12. There is sufficient freeboard between the upper surface 62 of the filter media 12 and the inlet conduit 24 to accommodate swirling.

The filter media 12 comprises a gravel bed 70 which substantially fills the conical bottom portion 46 of the housing 14 and a silica bed 72 which is supported by the gravel bed 70 and partially fills the intermediate portion 42 of the housing 14. Although different gravel and silica may be used, pea gravel sized ⅛ inch to ¼ inch is suitable, and the silica is preferably spherical with about a 35 mm diameter, or optionally, may have an irregular shape. The filter media 12 is preferably configured to remove particles that are at least 0.45 microns in size from process water as it passes downwardly there-through. Conventional engineering methods are used to properly select the size and packing density of the gravel and silica and, accordingly, to select the desired filter media removal efficiency.

By introducing the process water tangentially into the treatment device 10, the water is caused to swirl above the silica bed 72. The swirling assists in preventing channeling through the filter media 12. Moreover, the velocity of the swirling water is greater near the peripheral than the center, disturbing the silica bed 72 to become slightly coned shaped. The cone shape increases the effective surface area of the silica bed 72 and, hence, its capacity to treat water. Overall, the swirling, in conjunction with the coned silica bed 72, enables the filter bed to operate at an increased flow rate of approximately 25 to 30 percent. The device 10 can be configured to treat various flow rates. Notwithstanding, it is expected that a common treatment capacity of the present invention will be about 25–30 gals/min/ft$^2$.

Swirling the process water is also advantageous in that it imparts a centripetal force component to the flow whereby suspended solids are forced outwardly to the circular side wall 48 where a percentage of the suspended solids are kept in suspension. By temporarily or permanently keeping solids in suspension, fewer particles become deeply embedded in the filter media 12 or in the interstitial spacing of the media 12. Accordingly, upon backwashing, suspended solids quickly separate from the filter media 12. Since particles are more efficiently removed from the filter media 12, significantly less backwash water, in the range of about 50–60 percent, is required than with conventional filters of similar treatment capacity. This efficiency difference exists because traditional filters linearly introduce water through a filter media 12 which drives the particles deeply into the media 12 where they become impacted. Consequently, greater backwash flow is required to remove particles from the interstitial spaces deep within the filter media 12.

Figure 4:
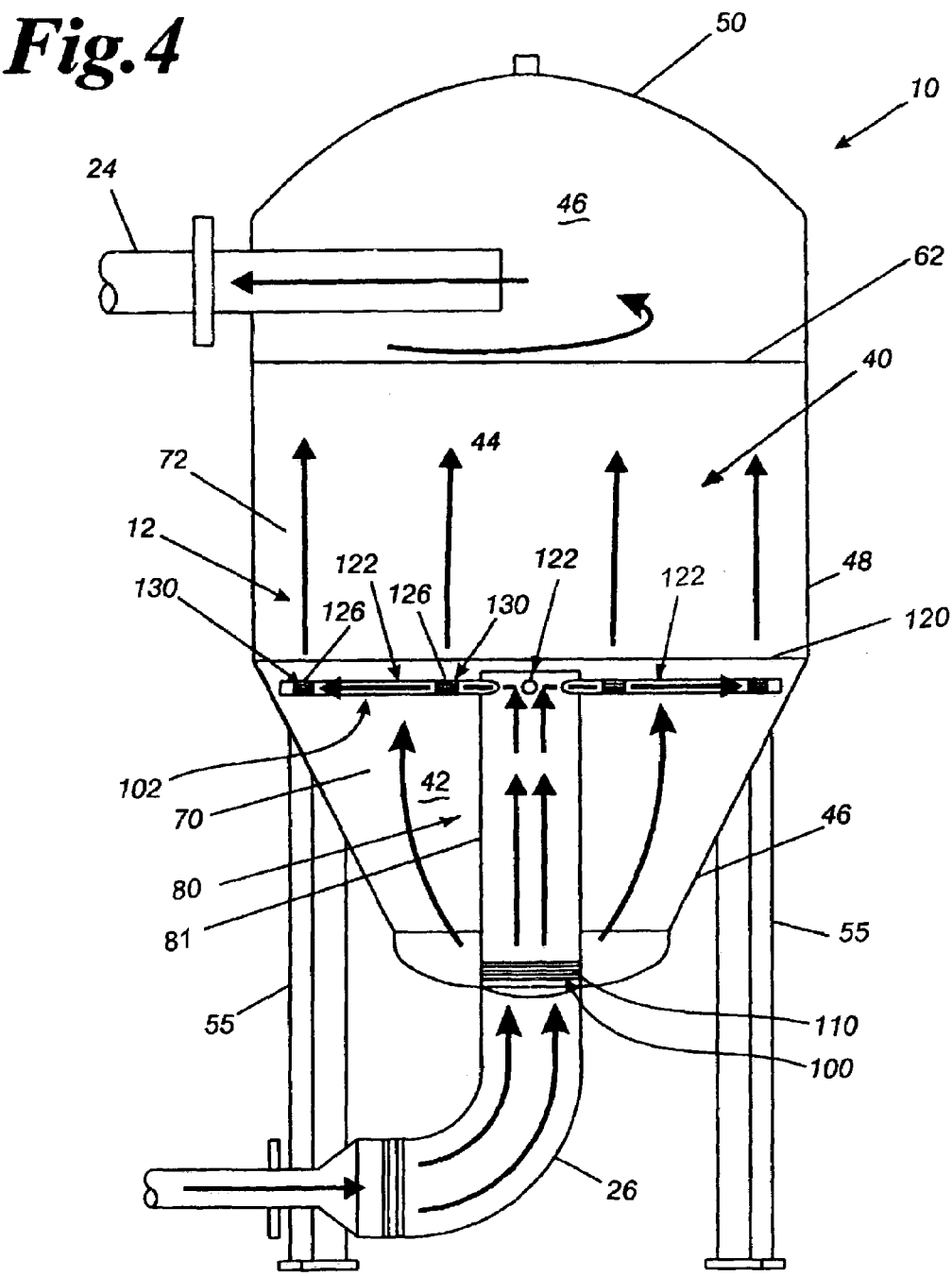
FIG. 4 is a cross sectional view of the water treatment device of FIG. 1, showing the treatment device in backwashing mode with an expanded filter media and a fluidizer for supplying backwash water, and showing the flow path of backwash water.

Referring to FIG. 4, in order to effectuate backwashing, flow is reverse through the treatment device 10 so that process water, city water if available, or collected effluent, flows into the device 10 through the outlet conduit 26, is forced upwardly through the filter media 12, then exits the housing 14 through the inlet conduit 24 for proper disposal. As an example, for the device 10 to treat 25–30 gals/min/ft$^2$, backwash water is introduced into the filter media 12 at a preferred rate of about 25 gal/min/ft$^2$ to fully fluidized the filter media 12 and to carry particles having a specific gravity that is less than that of gravel and silica from the housing 14. The freeboard within the housing 14 between the upper surface 62 of the silica bed 72 and the inlet conduit 24 is sufficient to enable settling of any silica which may be carried up by the rising backwash water. The frequency of backwashing can be controlled by a pressure switch, timer or manually actuated. When using a pressure switch, the preferred pressure drop is approximately 5–12 pounds/inch$^2$.

Complete fluidization of the filter media 12 during backwash is critical to thoroughly clean the media 12 of imbedded particles, re-stratify the filter media 12 and to break any bonding of the media 12 (for example, calcification from hard water). If the filter media 12 is not completely fluidized during backwashing, the filter media 12 may see no flow or minimal flow conditions. At these low flow areas, captured particles are not removed and the media 12 is not fully re-stratified. No flow conditions combined with non-removed foreign particles are detrimental since they provide a breeding ground for bacteria. Furthermore, an unfluidized filter media 12 becomes compacted, reducing the treatment capacity of the treatment device, and thus requiring replacement.

Complete fluidization of the filter media 12 includes the steps of lifting the entire filter media 12 from its fully packed condition and allowing it to expand at least 30 percent. This allows gravel, silica and captured particle to break free from neighboring matter.

Fluidization is accomplished by a fluidizer 80. Backwash water is delivered by the outlet conduit 26 to the fluidizer 80 for distribution throughout the filter media 12. The fluidizer 80 includes two distribution components, joined by a manifold 81, for delivering backwash water at predetermined locations to fully fluidize the media 12: a first fluidizer 100 and a second fluidizer 102. The first fluidizer 100 is disposed at the bottom of the conical portion of the housing 14 where it provides 360 degree annular flow. The location of the first fluidizer 100 obviates no flow and stagnation areas in the filter bed that may otherwise be found near the bottom of the media 12. The first fluidizer 100 provides complete lift of the filter bed causing the bed to expand at least 30%, unpack and separate.

Referring to FIGS. 4 and 5, the preferred first fluidizer 100 is a section of the fluidizer manifold 81 having a continuous V-shaped slot 110 which continuously turns, about 25 to 30 revolutions, around the fluidizer manifold 81, forming a spiral, ring-shaped, channel. That is, the first fluidizer slot 110 is generally shaped like a wedged wire spring. It is noted that the first fluidizer may be of any configuration that allows water to be introduced at the bottom of the media 12 and provides full fluidization of the media 12, as show in FIG. 4. For example, the first fluidizer slot 110 may extend a greater or lower number of revolutions around the fluidizer manifold 81. As another example, the first fluidizer may be formed of a plurality of slots instead of one continuous slot. In a further example, the first fluidizer may be a plurality of holes formed in the fluidizer manifold 81.

The V-shaped slot 110 is gapped to allow backwash water to pass there-through into the housing 14, but is sufficiently narrow to block filter media 12 from exiting the housing 14 through the fluidizer manifold 80. Not to be construed as limiting, a preferred gap to meet these requirements is between 1/100 and 1/120 of an inch. It is noted that this same V-notched slot is used to evacuate effluent when the device 10 is in treatment mode, and that the slot is sufficiently narrow so that filter media 12 is not inadvertently carried with the effluent there-through.

Backwash water is introduced to the filter media 12, at the interface 120 between the gravel bed 70 and silica bed 72, by the second fluidizer 102. The preferred embodiment of the second fluidizer 102 includes a plurality of arms 122 radially extending from the fluidizer manifold 81 to near the wall of the housing 14, near or along the gravel-silica interface 120. As illustrated in FIG. 6, the arms 122 are radially spaced at predetermined intervals throughout 360 degrees. In the preferred embodiment, the arms 122 are evenly spaced every 45 degrees such that eight radial fluidizer arms 122 are provided.

Each radial arm 122 is provided with slots 126 preferably having a width of about 1/100 inch, to allow backwash water to pass through-there while restricting filter media from entering. The slots 126 direct backwash flow upwards through the silica bed 72 (FIG. 4).

The slots 126 are arranged in groups 130 in order to distribute backwash water. In one such group 130, the slots 126 are arranged in series, that is, in a row transversely across each radial arm 122 at a preferred rate of about 10 slots/inch. A slot group 130 can include several columns of these rows.

Additionally, the slot groups 130 may be arranged in patterns to facilitate even distribution of backwash water in the filter media 12. In one possible pattern, the positioning of slot groups 130 alternate on adjacent radial arms 122. The first arm 132 includes a slot group 130 near the terminal end of the radial arm 122. The second arm 134 includes two slot groups 130: the first group 130 near the end of the second radial arm 134 and the second group 130 in the intermediate portion of the second radial arm 134. The alternating pattern repeats throughout the remaining radial arms 122.

The alternating pattern of slot groups 130 on the fluidizers arms 122 provides desired flow to create additional localized lift in order to fully develop and enhance fluidization of the filter media 12, as shown in FIG. 4. Accordingly, the amount of backwash water needed is reduced as is the time to efficiently remove captured particles from the filter media 12.

As it will be appreciated by the skilled practitioner in the art, the purpose of the second fluidizer 102 is to provide backwash water distribution to the silica bed 72 in order to enhance fluidization. As such, other configurations which embody this principle are within the scope of the invention. In similar fashion, the preferred positioning of slots 126 in the radial arms 122 may modified without departing from this invention.

Referring to FIG. 4, the conical shape of the bottom portion 46 of the housing 14 also assists in promoting fluidization by reducing the necessary volume and weight of the gravel bed 70, and forms the gravel bed 70 into a conical shape to eliminate dead spaces. The conical shape also enhances fluidization by reducing friction between the gravel bed 70 and housing wall as the bed expands. As a further benefit, the conical bottom portion 46 causes the gravel to turn over and circulate more efficiently during fluidization. As such, the reduced weight and conical shape allow complete fluidization to occur faster with less water usage than would be required for a conventional column filter of similar treatment capacity.

Under typical loading conditions, the backwashing method of the present invention is so effective at removing particulate matter that significant bacteria growth does not occur in the filter media 12. Additionally, a flocking agent is not typically not required since the treatment device 10 removes suspended solids at such a high efficiency. Notwithstanding the superior performance of the treatment device 10, under certain situation it may be desirable to provide chlorine or bromine for bacteria treatment, or a flocking agent, such as alum. As such, known automated or manual devices can be added to the water treatment device 10.

The operation of the treatment device 10 in treatment mode is illustrated by arrows in FIG. 3. Initially, process water is tangentially fed into the treatment device 10 through the inlet conduit 24 to impart a swirling motion to the process water above the upper surface 62 of the silica bed 72. The swirling water causes the silica bed 72 to become coned, increasing the silica bed's 72 effective surface area. Since the surface area is enlarged, the rate in which the silica bed 72 can treat the process water is increased.

Additionally, by causing the process water to swirl, a percentage of the suspended solids is maintained in suspension above the silica bed 72 while the process water passes downward through the filter media 12 where the remaining solids are stripped out from the process water. Hence, swirling the process water reduces particulate matter loading to the filter media 12, and reduces the amount of particles that would have become deeply imbedded or impacted in the filter media 12. Upon passing through the filter media 12, the purified water egresses the housing 14 through the first fluidizer 100 disposed at the bottom of the housing 14. The cleansed effluent is returned to the cooling tower for reuse.

FIG. 4 illustrates the treatment device 10 in backwash mode. To effectuate periodic backwashing, fluid flow is reversed in the treatment device 10 to accomplish complete fluidization. Process water, or city water if available, is conveyed through the outlet conduit 26, into the fluidizer 80, where it is forced into the filter media 12 at predetermined locations.

The first location is at the bottom of the filter media 12 where the first fluidizer 100 provides 360 degree annular flow to obviate no flow and stagnation areas in the filter media 12. The first fluidizer 100 operates to cause complete fluidization of the filter media 12, wherein the filter media 12 is expanded at least 30%.

Backwash water is also introduced at the interface 120 between the gravel media 12 and silica media 12 by the second fluidizer 102. The second fluidizer 102 directs backwash water upwards through the silica bed 72 for a more robust fluidization. This localized lift accelerates the backwash flow and improves removal efficiently of particles from the filter media 12.

As backwash water from the first fluidizer 100 and second fluidizer 102 is passed upwardly through the filter media 12, particles with a lower specific gravity than that of gravel or silica are carried through the filter media 12 and egress the housing 14 via the inlet conduit 24 for proper disposal. There is sufficient freeboard between the silica bed 72 and the inlet conduit 24 to allow silica, which have become entrained in the backwash, to settle back to the silica bed 72.

SUMMARY OF THE ACHIEVEMENT OF THE OBJECTS OF THE INVENTION

From the foregoing, it is readily apparent that we have invented a water treatment device having a filter media for purifying process water. The device effectively removes suspended solids from the process water. Moreover, the device fully fluidized and expands, by at least thirty percent, the filter media during backwashing in order to remove captured solids. The device is configured to provide superior solids removal during backwashing thereby increasing the effective life of the filter media.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A fluid treatment device, comprising:
   a housing;
   a filter media disposed within said housing, said filter media comprising a first media bed and a second media bed juxtaposed with said first media bed; and
   a fluidizer for backwashing said filter media, wherein said fluidizer comprises a first component fluidly connected to a second component, said first component being disposed at a first end of said filter media, and said second component being disposed at or near the interface between said first media bed and said second media bed;
   wherein said first component is adapted for allowing a first fluid to be delivered through said first component into the first end of said filter media, for backwashing said filter media; and
   wherein said second component is adapted for allowing the first fluid to be delivered through said second component into said filter media at or near the interface between said first media bed and said second media bed, for backwashing said filter media.

2. The fluid treatment device in accordance with claim 1 wherein said housing comprises a conical portion and wherein said first component is disposed within the conical portion.

3. The fluid treatment device in accordance with claim 2 wherein said first media bed contains gravel and said second media bed contains silica, and wherein said first media bed is disposed within the conical portion of said housing.

4. The fluid treatment device in accordance with claim 1 wherein said first component includes at least one opening wherein said at least one opening is adapted to allow the first fluid to be delivered from said first component at intervals throughout 360 degrees.

5. The fluid treatment device in accordance with claim 1 wherein said first component includes an opening for allowing the first fluid to be delivered to said filter media, wherein the opening extends at least 360 degrees around the circumference of said first component.

6. The fluid treatment device in accordance with claim 1 wherein said second component comprises a plurality of arm having openings through which the first fluid may pass.

7. The fluid treatment device in accordance with claim 6 wherein said arms are radially arranged.

8. The fluid treatment device in accordance with claim 7 wherein said arms are intermittently provided throughout 360 degrees.

9. The fluid treatment device in accordance with claim 1 further comprising a first conduit tangentially positioned along said housing, whereby said first conduit communicates with said housing to cause a second fluid to swirl above said filter media.

10. A fluid treatment device, comprising:
    a housing;
    a filter media disposed within said housing, said filter media comprising a first media bed and a second media bed juxtaposed with said first media bed; and
    a first means fluidly connected to a second means;
    said first means being disposed within said housing at one end of said filter media for directing a first fluid for backwashing said filter media; and
    said second means being disposed within said housing at or near the interface between said first bed and said second bed, for directing the first fluid for backwashing said filter media.

11. The fluid treatment device in accordance with claim 10 further comprising a conduit tangentially positioned along said housing, whereby said conduit communicates with said housing to cause a second fluid to swirl above said filter media.

* * * * *